United States Patent

[11] 3,615,693

| [72] | Inventors | Fred W. Billerbeck, Jr.;<br>Kerry S. Shoemaker, both of Fremont, Mich. |
|---|---|---|
| [21] | Appl. No. | 666,003 |
| [22] | Filed | Sept. 7, 1967 |
| [45] | Patented | Oct. 26, 1971 |
| [73] | Assignee | Gerber Products Company<br>Fremont, Mich. |

[54] PROCESS FOR PREPARING READY-TO-EAT MEAT PRODUCTS
2 Claims, No Drawings

[52] U.S. Cl. .................................................. 99/108
[51] Int. Cl. ........................................... A22c 18/00, B02c 18/00
[50] Field of Search ............................................. 99/108, 187

[56] References Cited
UNITED STATES PATENTS

| 1,388,699 | 8/1921 | Crocker .................... | 99/108 |
| 2,852,395 | 9/1958 | Gaumer ...................... | 99/108 X |
| 2,940,862 | 6/1960 | Forsyth ...................... | 99/187 |

FOREIGN PATENTS

| 688,286 | 6/1964 | Canada ...................... | 99/108 |

*Primary Examiner*—Hyman Lord
*Attorney*—Townsend and Townsend

ABSTRACT: A meat-containing product including particulate meat portions produced through conversion of the raw animal flesh to an emulsified form by subjecting the raw meat to sufficient size reduction to destroy the tissue structure. The emulsified particles, of indiscernible size, are reformed (shaped) into portions of discernible size and heated, to at least the denaturation temperature of the raw meat, at a rate sufficient to maintain the reformed portions substantially intact. The resulting reformed meat portions have excellent mastication and digestion characteristics and are especially useful in the preparation of infant food.

PROCESS FOR PREPARING READY-TO-EAT MEAT PRODUCTS

This invention relates to an edible meat product containing particulate portions of animal flesh that are especially suitable for consumption by infants and to the method for its preparation.

Products containing chunks (individual pieces) of animal flesh, prepared commercially in a ready-to-eat form for human consumption, are appetizing as well as beneficial for both adults and children. However, young children (infants) and physically infirm persons are frequently unable to accomplish the degree of mastication required for proper consumption and digestion of untrimmed or even partially trimmed meat chunks. The reason for this is that naturally occurring raw meat includes connective tissue, muscle fiber, gristle, cartilage, bone fragments and collagen as well as other components that are often difficult to chew even when thoroughly cooked. As a result, consumer acceptance of meat products having particulate character, and prepared for consumption by infants, has heretofore required the employment of special processing techniques to remove such components.

Many conventional separation techniques involve an extensive amount of tedious hand trimming that is not only time-consuming but economically unattractive. Even with this type of technique, complete removal of the undesirable components is impossible. In other techniques, partially trimmed or untrimmed flesh is comminuted to a particle size of as little as one-eighth inch in largest dimension and then subjected to various heating operations to provide the desired degree of cooking. However, size reduction, as practiced by the prior art, has not proved to be completely satisfactory as at least some of the undesirable characteristics, such as toughness, attributable to the aforementioned components, remain even when the heating is sufficient to thoroughly cook the comminuted meat. Thus, a fully satisfactory meat-containing material having particulate form is not presently commercially available.

In the present invention a ready-to-eat product containing meat particles having a particulate character is prepared from naturally occurring raw animal flesh by first "emulsifying" the raw meat, i.e., dividing the meat into particles of a size indiscernible to the naked eye. The meat emulsion thus obtained, and having a relatively smooth paste consistency, is reformed (shaped) into individual portions of a discernible size. These raw meat portions are then denatured (coagulated) through the use of high-temperature process conditions, set forth in detail infra, that are suitable for preventing dissociation of the reformed portions into the indiscernible particles. The resulting denatured portions have a particulate character approximately corresponding in cross-sectional size to the interim raw, reformed portions.

The indiscernible meat particles, preferably reduced to an average size of about 1.2 millimeters or smaller, in largest dimension, do not exhibit the aforementioned undesirable digestive characteristics common to meat products formed by conventional processes. Because the denatured portions obtained at the end of the process are each composed of a plurality of these indiscernible particles, the ease of mastication and digestibility of the coagulated meat pieces have similar desirable digestive characteristics.

In a preferred aspect, denaturation of the raw, reformed portions is accomplished by rapid heating with a heat source such as a hot fluid to provide a cooked, ready-to-eat product having denatured portions corresponding in at least cross-sectional dimensions to the raw, reformed portions. It will be appreciated by one skilled in this art that various hot fluids, including cooking oil or steam under atmospheric or superatmospheric pressure, may be employed to provide the heat necessary to produce the necessary denaturation. Special advantages have been obtained when an aqueous solution is employed as the coagulating fluid. Further process advantages result where the hot fluid is an aqueous solution suitable for retention as a portion of the ultimate consumer product.

The ultimate size of the denatured (coagulated) meat pieces is dependent upon the initial size of the raw reformed portions, provided that physical breakdown of the reformed portions is prevented prior to denaturation. Physical dissociation (breakdown) of the reformed portions has been found to be minimized by increasing the temperature of the raw meat portions to at least the denaturation temperature, i.e., about 140° F., as rapidly as possible. By minimizing the time employed to raise the reformed particles to the denaturation temperature, components such as fat, which melt below the coagulation temperature of the meat protein, do not have sufficient time to soften and partially destroy the firm particulate character of the reformed portions.

When a hot fluid is utilized as the heat source, the speed at which the raw meat is raised to the denaturation temperature, i.e., the time required for coagulation, is dependent upon the difference between the denaturation temperature of the meat and the temperature of the hot fluid which is at a temperature above the protein denaturation temperature. As this temperature differential increases, the rate of coagulation will be similarly increased. Desirable coagulation conditions are provided when the temperature of the hot fluid is about 50° F. higher than the temperature required to denature (coagulate) the raw meat. Reformed portions having a minimum average individual size of at least one-eighth inch in largest dimension can be converted to denatured portions of similar dimensions through the use of an aqueous fluid having a temperature in the range of 160°-212° F. Through the use of fluids at higher temperatures, larger reformed portions, e.g., up to 1 inch and larger, can be coagulated without appreciable loss in the size of the resulting denatured portions. Those skilled in this art will appreciate that through careful control of process conditions, reformed portions of any practical size may be converted to denatured pieces of corresponding dimensions.

In practice, the meat is usually subjected to partial size reduction such as grinding prior to actual emulsification. However, physical comminution of the raw meat, produced by friction, increases the temperature of the ground intermediate. Thereafter, an additional temperature increase is produced during emulsification. As the temperature of the emulsified meat (and subsequently the reformed portions) approaches about room temperature, i.e., in the range of about 65°-70 F., fat and moisture tend to separate from the other meat components. As a result, the discernible portions are not only difficult to form from the emulsified particles, but they tend to exhibit nonuniform size. This problem may be encountered regardless of the actual fluid temperature employed to accomplish subsequent denaturation.

To compensate for the temperature increase generated during size reduction, it has been found to be advantageous to lower the temperature of the raw untrimmed meat, such as by freezing, prior to the initial size reduction. In this manner, the heat that is created during grinding may be substantially completely dissipated through replacement of the heat of fusion of the aqueous content of the raw meat. Thus, little or no actual rise in the temperature of the comminuted composition may be produced. By retaining the temperature of the ground meat near about 32° F., the temperature after emulsification is seldom more than about 35°-50° F. In this way, the reformed portions retain maximum firmness and particulate character prior to the high temperature coagulation. Freezing has the additional advantage of solidifying the raw meat so that initial size reduction (comminution) is more easily accomplished.

In another aspect of the invention, it has been found that the definition and firmness of the reformed portions can be further enhanced by combining the meat emulsion with a binding agent, preferably in minor amounts such as up to about 4 percent by total weight, prior to reforming. With the use of binding agents, reformed portions of greater cross-sectional area can be more easily converted to coagulated portions of similar cross section since the reformed portions are less fragile. Binding agents such as protein concentrates have the additional advantage of increasing the nutritional value of the discrete meat particles. Particularly good results have been obtained through the use of from about 1½–3½ percent by weight of Proteinate GL 301, a soy protein concentrate manufactured by Griffith Laboratories, Inc., 1415 37th Street, Chicago, Illinois. Other binding agents such as flour and starch are useful when employed in larger proportions up to 20 percent by total weight.

The term "animal flesh" as used herein is intended to include lamb, beef, veal, turkey, pork, chicken and ham, as well as other conventional types of edible meat products.

The aforementioned ultimate size reduction, i.e., "emulsification," can be accomplished with any of the conventional equipment available for dividing animal flesh into indiscernible particles within the aforementioned size range. However, milling devices are especially suitable for producing the necessary particle size reduction. Those devices that are especially advantageous attain the desired particle comminution with a minimum of temperature increase. In this regard, Mincemaster, Model 1528, available from Griffith's Laboratories, Inc., has been found to be useful for the milling operation.

Reforming of the emulsion into portions having the desired discernible size can be accomplished with the use of well-known techniques presently employed in the food processing industry for handling a cold viscous emulsified product. Conventional high-pressure, extrusion equipment including feed pumps, extruder heads and cutters has been found to be especially satisfactory for conveying and discharging the cold meat emulsion. In this manner, the emulsion is divided into small elongated segments having a relatively large surface and being especially suitable for rapid heat transfer. It will be apparent to one skilled in this art that other devices for handling fluidized materials will also be useful in the practice of this invention.

By reforming the emulsion and immediately discharging the reformed raw meat portions directly into a hot aqueous solution, e.g., by submerging a perforated extruder head in a tank of hot aqueous solution, even greater control of coagulation is obtained. With such a technique, the reformed portions of desired size can be rapidly converted to the permanent coagulated particle sought without danger of mechanical destruction of the temporarily reformed portion which lacks the cohesive forces supplied by denaturation and coagulation. Furthermore, by forming the perforated extruder head from a material of low thermal conductivity, heat loss from the solution into the extruder and attendant precooking of the emulsion is minimized. Particularly suitable extrusion heads have been formed from polyolefins such as Teflon, especially where the perforations are in the range of one-sixteenth inch to three-eighths inch and flared at the outer end.

Other equipment features that have proved to be advantageous include a cutter blade for attachment and rotation along the outer surface of the extruder head to cut the extruded emulsified portions into short segments as it leaves the extruder to be coagulated. Alternatively, the reformed emulsion may be extruded into a hot aqueous solution in long spaghettilike strands and then divided into shorter lengths subsequent to coagulation. In addition, stirring devices and the like, for agitation of the hot aqueous solution during extrusion of the meat emulsion, may facilitate rapid uniform coagulation, help in the dispersion of the meat, and prevent the development of excessively large particles.

As stated supra, it is advantageous to employ the fluid portion of the ultimate meat-containing product as the hot aqueous solution. In this manner, cooking of the entire product to be offered to the consumer can be accomplished concurrently with the coagulation of the meat particles. In addition, no separation of the particulate meat portions and the coagulating solution is necessary. It will be apparent to one skilled in this art that a hot aqueous solution may be employed that contains other edible components such as vegetables, paste, and strained meat to produce a wide variety of meat-containing products. In addition, other conventional process operations can be practiced where it is desirable to vary the ultimate composition. For example, a fat-rich fraction may be removed or the solids content changed by increasing the amount of liquid present.

To further illustrate the invention, the following examples are provided. It should be understood that the particular details of the examples are not to be regarded as limitations as they may be varied as will be understood by one skilled in this art.

EXAMPLE I–Agglomerated particles in aqueous fluid

One hundred pounds of beef (in frozen whole carcass form) were passed through a Ritz Extructor having a three-sixteenth inch plate. The comminuted product was then processed in a 15 horsepower Urschel Commitrol mill having a milling head including 0.045 inch openings. The resulting meat emulsion had a temperature of about 40° F.

An extruder having a Teflon plate including ⅛-inch perforations was positioned to open into a solution tank. A cutter knife was mounted for rotational movement on the outside of the Teflon plate. The tank was filled with sufficient water to submerge the extruder head and the temperature of the water adjusted to about 190° F.

The raw "emulsified" meat was pumped through the extruder into the hot water. The resulting agglomerated particles were found to have an average particle size of about three-sixteenth inch in largest dimension. The particles were maintained at the agglomeration temperature for a period of about 45 seconds to complete cooking thereof. The liquid was drained off and the cooked meat particles stored for further processing consistent with practice in the infant food industry. Despite the fact that the whole beef carcass was used as the starting material, the final particles were found to be visibly free of connective tissue, muscle, fiber, gristle, cartilage, bone fragments, collagen and the like.

EXAMPLE II–Agglomerated particles in strained meat fraction

In a manner similar to example I, an infant beef stew was prepared having the following proportions:

| Ingredient | Quantity Weight/100 Gallons |
| --- | --- |
| Beef, lean | 85 |
| carrots (diced one fourth inch) | 60 |
| whole peas | 35 |
| starch, modified food | 35 |
| corn, whole kernel | 30 |
| potatoes (diced, crushed, dehydrated) | 23 |
| tomato puree (32 percent total solids) | 10 |
| salt, crystallized | 6 |
| protein concentrate GL 301* | 1.5 |
| misc. seasoning | 2.0 |

*Available from Griffith Laboratories, Inc.

The emulsified meat was extruded through ⅜-inch perforations directly into 30 gallons of water at 190° F. under agitation. The vegetables and dry ingredients were separately prepared, slurried in cold water and heated with agitation to 160° F. The agglomerated meat-containing solution was added thereto and heated to 190° F. with further agitation. The total solids content was adjusted to 14.62 percent by weight with hot water and the slurry pumped into small glass containers and processed in the manner conventional to the infant food industry. The use of the binding agent resulted in agglomerated meat portions having an average particle size of about three-eighths inch in largest dimension of enhanced firm, compact structure.

Although the foregoing invention has been described in some detail by way of illustration and example for purposes of clarity of understanding, it is understood that certain changes and modifications may be practiced within the spirit of the invention as limited only by the scope of the appended claims.

We claim:

1. A process for converting naturally occuring raw untrimmed meat containing connective tissue, muscle fiber, gristle, cartilage, bone fragments, and collagen into an easily digestible, ready-to-eat meat product, consisting of the steps of: milling the raw meat to provide particles of a size indiscernible to the naked eye, said particles having a largest dimension smaller than about 1.2 millimeters; extruding said indiscernible particles so as to reform raw meat portions having a discernible size; and immediately thereafter heating said reformed portions to at least the coagulation temperature of said raw meat to agglomerate the indiscernible particles within said reformed portions, said immediate heating being accomplished by extruding said reformed portion below the surface of a hot aqueous solution, said solution being maintained at a temperature about 50° F. higher than the temperature required to coagulate said raw meat, whereby dissociation of said reformed portions will be prevented.

2. A process in accordance with claim 1 wherein said reformed portions have an average size of about three-sixteenth inch in largest cross-sectional dimension.